Oct. 12, 1926.
E. H. BAKENHUS
1,602,385
GATE HOLDER
Filed August 8, 1922
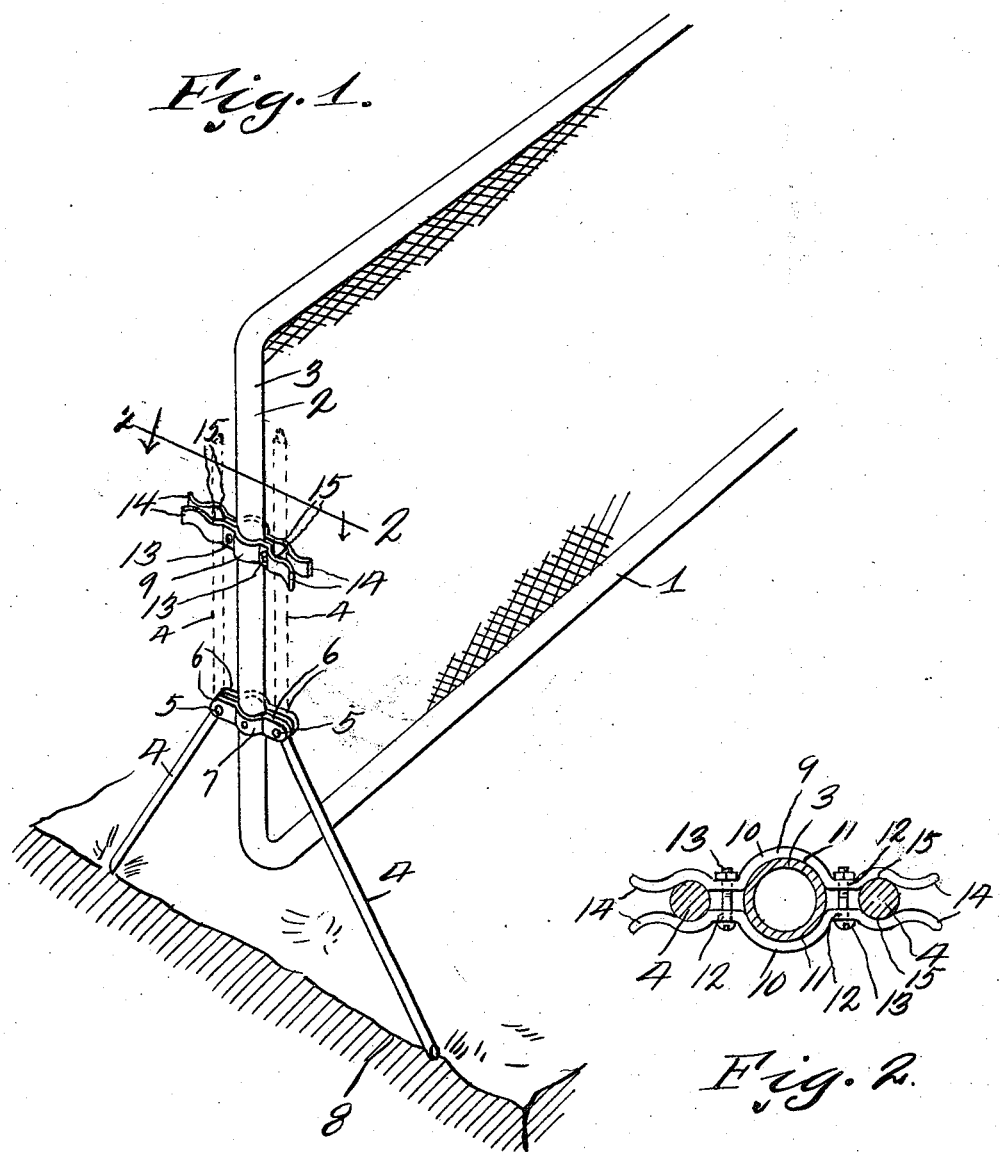
Inventor
E. H. Bakenhus Patented Oct. 12, 1926.

1,602,385

UNITED STATES PATENT OFFICE.

EMIL H. BAKENHUS, OF LEIGH, NEBRASKA.

GATE HOLDER.

Application filed August 8, 1922. Serial No. 580,538.

The invention relates to a gate holder, and has for its object to provide the free end of the gate adjacent its lower corner with pivoted members movable in a plane at a right angle to the plane of the gate, either pivoted member being adapted to be placed in engagement with the ground at an incline for holding the gate in open position.

A further object is to provide spaced spring arms carried by the gate above the pivotal points of the arms for receiving and holding the arms out of operative position if so desired.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1 is a perspective view of the free end of a gate, showing the device applied thereto.

Figure 2 is a horizontal sectional view taken on line 2—2 of Figure 1, showing the spring arms in plan view and the pivoted arms in section.

Referring to the drawing, the numeral 1 designates a conventional form of gate, which gate is preferably formed from piping and 2 the free end thereof, which is formed from a vertically disposed section of the piping 3. It has been found that gates, particularly of the farm type, which swing in a horizontal plane will not remain open, and to obviate this difficulty pivoted members 4 are provided, which members may move in a vertical plane at a right angle to the gate. The upper ends of the pivoted members 4 are pivoted at 5 between the ears 6 of a bracket 7 secured to the portion 3 of the piping adjacent the lower end thereof. It will be seen that when it is desired to hold the gate against movement in one direction or the other, the pivoted members 4 may be placed in engagement with the ground 8; one or both of said members is used as desired.

Disposed above the brackets 7 and carried by the pipe portion 3 is a holding device 9 for holding either or both of the pivoted arms 4 out of operative position. The device 9 comprises spaced members 10, which members are provided with segmental recesses 11 which receive the opposite sides of the piping 3 and with outwardly extending arms 12, which are spaced from each other and through which arms the securing bolts 13 extend. It will be seen that the bolts 13 hold the members 10 on the piping portion 3 and against upward and downward displacement. The arms 12 terminate in outwardly, inwardly and outwardly extending spaced arms 14 in the recesses 15 of which the opposite sides of the pivoted arms 4 are received, the arms 14 spreading outwardly when the pivoted arms are forced therebetween. It will be seen that by tightening the bolts 13, the tension of the spring arms 14 may be varied, thereby allowing the arms 4 to be held as tightly as desired.

From the above it will be seen that a gate holding device is provided, which is simple in construction, may be applied to a conventional form of gate and one wherein means is provided for holding the pivoted arms in inoperative position if so desired.

The invention having been set forth what is claimed as new and useful is:—

The combination with the vertical bar of the free end of a gate, arms pivotally connected to said bar at opposite sides thereof and movable in a plane thereof adapted to engage the ground, of a clamp for holding said arms in a vertical position adjacent the bar, said clamp being horizontally disposed and comprising registering members extending transversely in relation to the gate, said registering members having bar receiving recesses in their adjacent faces, flattened portions at opposite sides of the bar, bolts extending through said flattened portions, recessed arm receiving spring arms carried by said flattened portions adjacent the bolts and adapted to receive and grip the pivoted arms, said bolts forming means for clamping the registering members on the gate bar and also forming means whereby the gripping action of the pivoted arm receiving members may be varied.

In testimony whereof I hereunto affix my signature.

EMIL H. BAKENHUS.